(12) United States Patent
Hardie et al.

(10) Patent No.: US 10,237,628 B2
(45) Date of Patent: Mar. 19, 2019

(54) TRACKING AND MEASUREMENT ENHANCEMENTS IN A REAL-TIME ADVERTISEMENT BIDDING SYSTEM

(71) Applicant: Oath Inc., New York, NY (US)

(72) Inventors: Brian Hardie, San Francisco, CA (US); Brandon Dement, San Francisco, CA (US); John Kim, San Francisco, CA (US); Derek Chung, San Francisco, CA (US)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 14/612,758

(22) Filed: Feb. 3, 2015

(65) Prior Publication Data

US 2015/0222961 A1     Aug. 6, 2015

Related U.S. Application Data

(60) Provisional application No. 61/935,320, filed on Feb. 3, 2014.

(51) Int. Cl.
| | |
|---|---|
| *H04N 7/16* | (2011.01) |
| *H04N 21/81* | (2011.01) |
| *H04N 21/237* | (2011.01) |
| *H04N 21/2547* | (2011.01) |
| *H04N 21/24* | (2011.01) |
| *H04N 21/258* | (2011.01) |
| *H04N 21/239* | (2011.01) |
| *H04N 21/437* | (2011.01) |
| *H04N 21/2668* | (2011.01) |
| *G06Q 30/02* | (2012.01) |

(52) U.S. Cl.
CPC ......... *H04N 21/812* (2013.01); *G06Q 30/02* (2013.01); *H04N 21/237* (2013.01); *H04N 21/2393* (2013.01); *H04N 21/2407* (2013.01); *H04N 21/2547* (2013.01); *H04N 21/25891* (2013.01); *H04N 21/2668* (2013.01); *H04N 21/437* (2013.01)

(58) Field of Classification Search
CPC .... H04N 60/43; H04N 21/4422; H04N 60/33; H04N 7/17309; H04N 21/44222; H04N 21/6582; H04N 21/4532; H04N 21/812; H04N 21/25891; H04N 21/4394; H04N 21/44008
USPC .......... 725/13, 14–20, 93, 116, 87, 88, 102; 709/217–232
See application file for complete search history.

(56) References Cited

U.S. PATENT DOCUMENTS

| | | | | |
|---|---|---|---|---|
| 5,929,849 A * | 7/1999 | Kikinis | ............... | H04N 5/44543 348/E5.002 |
| 8,473,997 B2 * | 6/2013 | Qiu | .................... | H04N 21/4384 725/109 |

(Continued)

*Primary Examiner* — Annan Q Shang
(74) *Attorney, Agent, or Firm* — Cooper Legal Group, LLC (57) ABSTRACT

Using the disclosed technology, a client device can receive a response from a real-time bidding engine of a real time bidding advertisement insertion system. The response includes information related to a video advertisement to be played by a video player at the client device. The client device can provide the video advertisement to a video player on the client device, execute a program associated with a third-party service provider and send a signaling to a destination provided by the third-party service provider to indicate occurrence of a predefined event as defined by the third-party service provider.

22 Claims, 6 Drawing Sheets

(56) References Cited

U.S. PATENT DOCUMENTS

| | | | | |
|---|---|---|---|---|
| 8,478,250 B2* | 7/2013 | Rao | H04L 67/06 | 345/594 |
| 8,578,412 B2* | 11/2013 | Van Vleck | H04N 21/8456 | 725/110 |
| 8,713,603 B2* | 4/2014 | Kilar | G06Q 30/02 | 725/32 |
| 8,782,696 B2* | 7/2014 | Moonka | G06Q 30/02 | 705/14.41 |
| 8,799,951 B1* | 8/2014 | Hamilton | H04N 21/2668 | 725/12 |
| 8,832,745 B2* | 9/2014 | Stallings | H04N 21/42209 | 725/44 |
| 8,850,471 B2* | 9/2014 | Kilar | H04N 21/812 | 725/32 |
| 8,997,150 B2* | 3/2015 | Kilar | G06Q 30/02 | 725/40 |
| 9,712,585 B2* | 7/2017 | Lohmar | H04L 65/4076 | |
| 10,037,546 B1* | 7/2018 | Benisch | G06Q 30/0248 | |
| 2001/0001160 A1* | 5/2001 | Shoff | H04N 5/44543 | 725/51 |
| 2002/0104090 A1* | 8/2002 | Stettner | H04N 5/4401 | 725/60 |
| 2003/0149975 A1* | 8/2003 | Eldering | H04N 7/17318 | 725/34 |
| 2005/0060232 A1* | 3/2005 | Maggio | G06Q 30/02 | 705/14.19 |
| 2006/0168619 A1* | 7/2006 | Reams | G06Q 30/02 | 725/38 |
| 2006/0212355 A1* | 9/2006 | Teague | G06Q 30/02 | 705/14.16 |
| 2006/0294538 A1* | 12/2006 | Li | H04N 7/17318 | 725/24 |
| 2007/0214049 A1* | 9/2007 | Postrel | G06Q 10/02 | 705/14.17 |
| 2008/0066107 A1 | 3/2008 | Moonka et al. | | |
| 2008/0189215 A1* | 8/2008 | Travez | G06Q 30/02 | 705/80 |
| 2009/0307732 A1* | 12/2009 | Cohen | G06Q 30/02 | 725/87 |
| 2009/0316688 A1* | 12/2009 | Meenavalli | H04L 29/06027 | 370/352 |
| 2010/0031162 A1* | 2/2010 | Wiser | G06Q 30/0255 | 715/747 |
| 2011/0055864 A1* | 3/2011 | Shah | H04N 7/1675 | 725/31 |
| 2011/0078305 A1* | 3/2011 | Varela | G06Q 30/02 | 709/224 |
| 2011/0078718 A1* | 3/2011 | Jakobi | G06Q 10/00 | 725/14 |
| 2012/0060188 A1* | 3/2012 | Stallings | H04N 21/42209 | 725/44 |
| 2012/0072949 A1* | 3/2012 | Rakshit | G06Q 30/0251 | 725/35 |
| 2012/0110616 A1* | 5/2012 | Kilar | H04N 21/812 | 725/32 |
| 2012/0144416 A1* | 6/2012 | Wetzer | H04N 21/25816 | 725/14 |
| 2012/0240177 A1* | 9/2012 | Rose | H04N 21/252 | 725/116 |
| 2013/0074131 A1* | 3/2013 | Cerveau | H04N 21/2387 | 725/88 |
| 2013/0081073 A1* | 3/2013 | Kang | H04N 21/4316 | 725/14 |
| 2013/0205326 A1* | 8/2013 | Sinha | G06T 1/0021 | 725/23 |
| 2014/0173038 A1* | 6/2014 | Newton | H04L 41/0893 | 709/219 |
| 2014/0201126 A1* | 7/2014 | Zadeh | G06K 9/627 | 706/52 |
| 2014/0250457 A1* | 9/2014 | Ramaswamy | H04N 21/812 | 725/34 |
| 2014/0351835 A1* | 11/2014 | Orlowski | H04N 21/44204 | 725/9 |
| 2014/0380346 A1* | 12/2014 | Jagtiani | H04N 21/25891 | 725/13 |
| 2015/0046935 A1* | 2/2015 | Wei | G06Q 30/0251 | 725/14 |
| 2015/0181306 A1* | 6/2015 | Innes | G06F 17/28 | 725/74 |
| 2016/0029061 A1* | 1/2016 | Pizzurro | G06Q 30/02 | 725/14 |

* cited by examiner

TRACKING AND MEASUREMENT ENHANCEMENTS IN A REAL-TIME ADVERTISEMENT BIDDING SYSTEM

CROSS REFERENCE TO RELATED APPLICATIONS

This application claims the benefit of U.S. Provisional Patent Application No. 61/935,320, filed on Feb. 3, 2014, and which is incorporated by reference herein in its entirety.

TECHNICAL FIELD

This patent application relates to systems and techniques for bidding advertisements in one or more communication networks such as the Internet.

BACKGROUND

Many companies seek to attract customers by promoting their products or services as widely as possible. Online video advertising is a form of promotion that uses the Internet and World Wide Web for delivering video advertisements to attract customers. Online advertising is often facilitated through companies called online advertising networks that connect advertisers to web sites that want to sell advertising space for displaying advertisements. Such an advertising network aggregates advertisement space supply from various websites (including on-line content publishers) and matches the aggregated advertisement space supply with advertiser demand. Advertisement exchanges are technology platforms used by online advertising networks for buying and selling online advertisements or advertisement impressions. Advertisement exchanges can be useful to both buyers (e.g., advertisers and ads agencies) and sellers (e.g., online publishers) because of the efficiencies and other advantages they provide. Various advertisement exchanges are, however, often limited by the types of advertisements they can buy and sell, their inventory sizes, and abilities in targeting specific viewers (e.g., potential customers).

The growing number of users accessing the Internet using video-playback capable wireless devices such as smartphones, tablet devices and laptop computers creates opportunities for large volumes of online video advertising and a demand for improvements to online video advertising.

DETAILED DESCRIPTION

The disclosed technology can be used in various implementations that facilitate communications with tracking and measurement third-party services and service providers in a real-time bidding (RTB) system for video advertisements. The disclosed implementations can be configured to provide a reliable and efficient client side component that interfaces with the third party service providers to enable generation and transmission of various video advertisement tracking and measurement operations. The disclosed implementations relate to various operations, devices and computer program products that enable acquisition of tracking and measurement results for an arbitrary period of time rapidly and efficiently, at any time and from any place.

For the purposes of illustration, the present application sometimes refers to existing industry standards or specifications as examples of how the disclosed techniques may be used in an RTB system. The disclosed technologies, however, can be used in various RTB systems beyond the specific RTB systems and/or standards mentioned in the examples of the present application.

BrightRoll Exchange (BRX) is an implementation of digital video advertisement exchange technologies by BrightRoll, Inc. (San Francisco, Calif.) and offers billions of monthly video advertising impressions, reaching millions of users on thousands of web sites and mobile applications on different user devices, such as mobile phones, tablets, laptop computers, desktop computers, Web-connected game machines and Web-connected TVs. Real-Time Bidding (RTB) allows buyers to bid on advertisement inventory using their own decision making technology for video ads on an impression-by-impression basis, moving buy-side advertisement decision making up in the delivery chain to the buyers own platform from the publisher's advertisement server or exchange. RTB enables buyers to decide whether to bid on a particular impression, how much they want to pay or which creative they want to deliver (unlike non-RTB models that require the buyer to serve an advertisement when the downstream advertisement server determines the impression meets the buyer's need, and the buyer only has an opportunity for creative optimization). The RTB auction platform evaluates all the bids, determines the winner and serves the winning creative.

Figure 1:
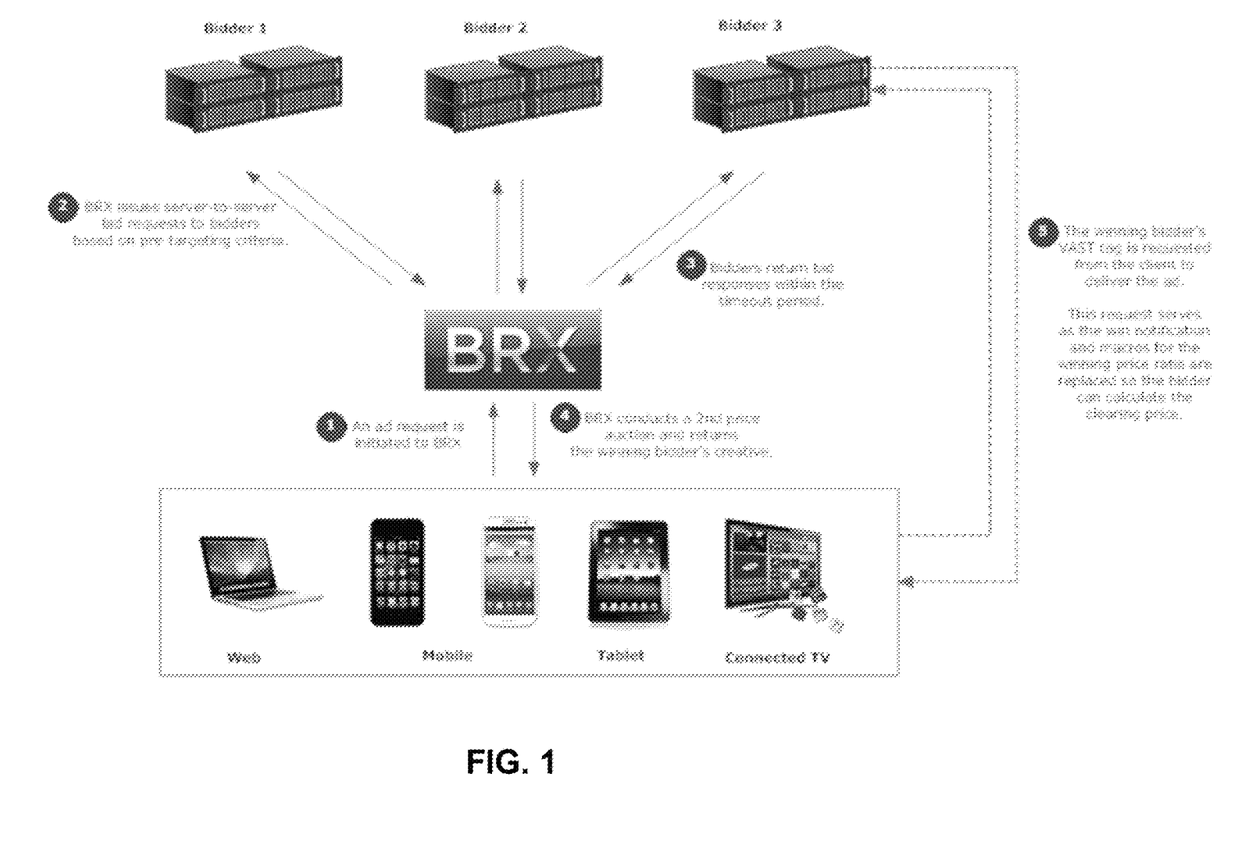
FIG. 1 is an example of a simplified block diagram of a real-time bidding (RTB) system that is implemented in one version of the BrightRoll Exchange (BRX) RTB system from BrightRoll Inc.

FIG. 1 is an example of a simplified block diagram of the BRX RTB system that shows an exemplary transaction procedure in a BRX RTB system. The BRX RTB system includes one or more computer servers that provide the software modules and processing capabilities for implementing and providing BRX RTB functions. Bidders are bidder computer servers in communications with the BRX RTB system. The described procedure is provided to facilitate the understanding of the work flow of a transaction but is not intended to provide a comprehensive description of the BRX RTB system. At the process 1, the user encounters a video ad opportunity on a website or in an application, and a BRX ad request is initiated. At the process 2, the BRX issues bid requests to bidders that qualify for the impression opportunity based on pre-targeting settings. At the process 3, each bidder makes an advertisement decision based on the campaigns trafficked within their systems and returns a bid response (including, e.g., a maximum bid and the creative details) within the timeout period as defined in the bid request (e.g., 90 ms). At the process 4, the BRX conducts a second-price auction, determines the winning bid, replaces a macro in the creative URL to reflect the clearing price (e.g., as a ratio of the maximum bid) and serves the associated creative down to the client. At the process 5, the website or application requests the winning creative (thereby communicating the clearing price to the bidder) and serves the ad to the user.

In an exemplary RTB workflow, the publisher player makes a request for the ad service, and the ad servers respond with a Video Ad-Serving Template (VAST) document, where VAST is a specification by the Interactive Advertising Bureau (IAB) that provides a common ad response format for video players that enables video ads to be served across all compliant video players. In accordance with the disclosed embodiments, a VAST document provided by the RTB includes a media file that points to a Scout software module, which is a client-side component of the RTB system and is implemented to collect video ads activities on the client side. Further details of the Scout are provided below. The publisher player can load the Scout into itself using, e.g., the Video Player Ad-Serving Interface Definition (VPAID) specification. VPAID establishes a common interface between video players and ad units to allow interactive in-stream ad experiences and provides a communication protocol between video players and ad units to allow a single executable ad (one that requires software logic to be executed as part of ad playback) to be displayed in-stream with the publisher's video content, in a compliant video player. The Scout operates to provide various additional features and functionalities, depending the particular RTB procedure in use. As described below, a Scout can also be deployed in third party services or devices for RTB tracking and measurement functions.

Once playback of the advertisement on the client device starts, various parameters, actions and events may be tracked and measured. Such measurement and tracking is often carried out with the help of pixels that are fired upon occurrence of certain events associated with the video advertisements. The term "firing pixels" refers to triggering a communication request in form of an http request to a server that is going to log that request to indicate that some event has happened. For example, if it is desired to track that an ad impression has occurred, an http request with some parameters related to the ad can be generated to indicate actual occurrence of the video ad impression. The pixels are fired when a component at the user device recognizes that a qualified event has occurred, which triggers the notification of the appropriate server or entity. For example, firing pixels can be sending a signaling or notification to a destination provided by the third-party service provider to indicate occurrence of a predefined event as defined by the third-party service provider. These are critical to the BRX system and can be used to expedite billing, as well as monitoring the effectiveness of various ad campaigns as tracked by third-party service providers.

The following table provides a sample listing of events that can trigger firing of the pixels. In table below, the client-side component (i.e., the Scout) fires the pixels. As provided in the table below, the event behavior can be adjustable based on the type of file (e.g., a VPAID unit or a Video such as FLV). When parsing a VAST document, the Scout collects any tracking pixels provided and fires each of them upon receiving the corresponding event. The Scout may find and collect pixels at any number of levels while following VAST wrapper tags. The pixels are often fired in the order they were found. In any given VAST document, the Scout may find any number of pixels for each event type. All pixels are often fired in the order they were found. In the table below, Click-Tracking refers to tracking a user's actions of clicking on an advertisement that directs the user to another content, ad or website.

| Event | VPAID Behavior | Video Behavior |
|---|---|---|
| impression | Fired upon receiving AdImpression | Fired upon video progress |
| start, creativeView | Fired upon receiving the AdVideoStart event | When we try to play the video |
| firstQuartile, midpoint thirdQuartile | Fired upon receiving the corresponding VPAID AdVideo* event | Fired at 25%, 50%, and 75% progress respectively |
| complete | Fired upon receiving the AdVideoComplete event | Fired after playing last frame of video |
| pause | Fired upon receiving the AdPaused event | Fired after pausing playback |
| fullscreen | Fired after processing a resizeAd request with viewMode= 'fullscreen' | Fired after processing a resizeAd request with viewMode= 'fullscreen' |
| mute, unmute | Fired after setting the volume to 0 or non-0 respectively | Fired after setting the volume to 0 or non-0 respectively |
| ClickTracking | Fired after receiving and handling AdClickThrough | Fired after handling a click on the ad |

Other events and behaviors can be defined and implemented as needed through the use of the Scout and/or can be prescribed through third-party tools and services that are engaged with the client device and the RTB system. The information obtained from the tracking pixels (both from BRX and third-party VAST tags) is collected and analyzed at the BRX system and/or at third party services.

The third-party tracking and measurement services (e.g., Nielsen, comScore, Telemetry, etc.) provide various additional information such as demographic information about the users, popularity of video and audio content, effectiveness of an advertisement campaign, and other tracking and measurement services. The BRX system may use such third-party services to, for example, obtain age and demographic information for a site to facilitate the bidding process and placement of a video advertisement. To provide these services and functionalities, such third-party services often rely on information that is provided to them when a particular advertisement is selected to run on a particular website, and upon the occurrence of certain events, such as the extent the advertisement was viewed, user interactions with the advertisement and the like.

The disclosed technologies can be used to enable seamless integration of various third-party services with the BRX system by taking advantage of the Scout, and further receiving and processing the third-party data at the BRX system.

Figure 2:
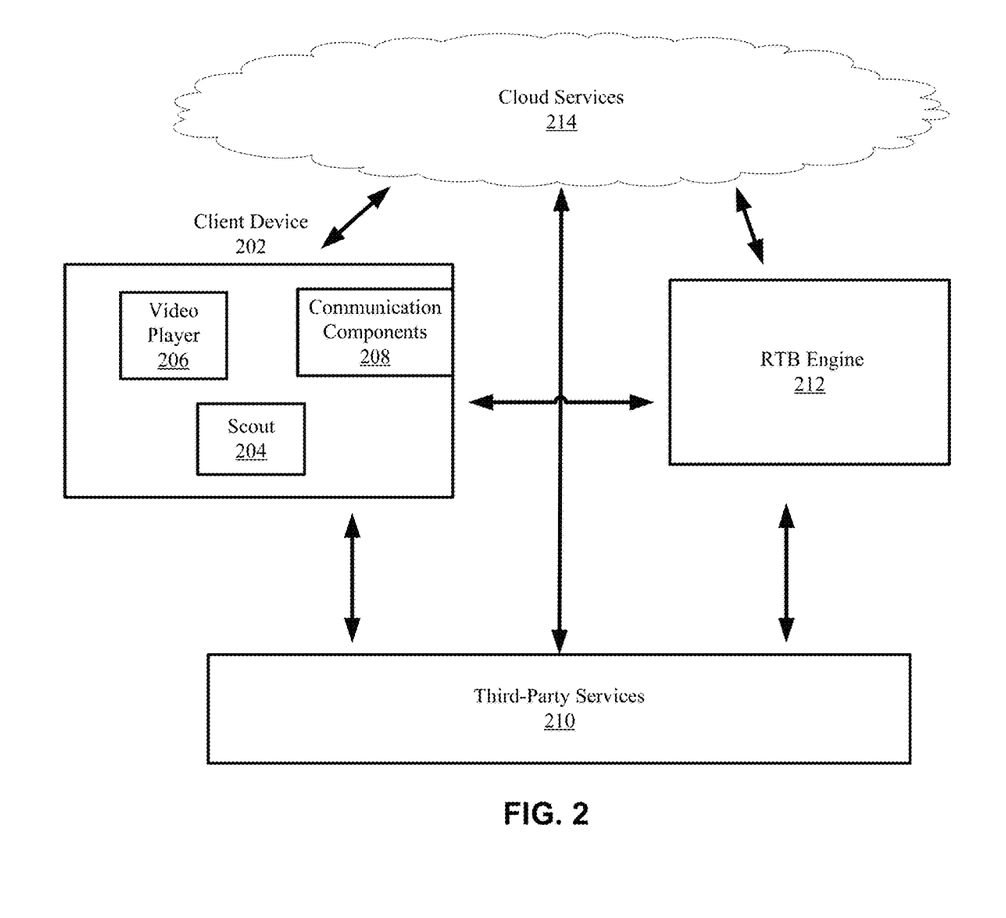
FIG. 2 illustrates a simplified diagram of a real-time bidding system that includes a plurality of client devices, third-party services, a real-time bidding engine, and cloud services in accordance with an exemplary embodiment.

FIG. 2 illustrates an example of a simplified diagram of a real-time bidding system that includes a plurality of client devices 202 (only one user device is shown), third-party services 210 that interact with a real-time bidding engine 212. For simplicity, additional components of the real-time bidding system are not shown in FIG. 2. The client device 202 further includes communication components 208 that are configured to communicate through a network connection with various entities, including the real-time bidding (RTB) engine 212 and one or more third-party services 210 (e.g., tracking and measurement service providers such as Neilson, etc.). The Scout 204 is a software module in the client device 202 and operates as an interface between the publisher and the third-party services 210. Among other functionalities, the Scout provides, and has control over, various types of tracking information that may be desired for collection and analysis. In some example embodiments, the Scout is in the form of a Small Web Format (SWF) file that implements the VPAID specification. Such an implementation allows the Scout to be loaded and managed by a VPAID compliant ad player (e.g., video player 206) on the client device 202. The Scout further provides uniformity and consistency for advertisers and third-party service providers since such advertisers and/or third-party service providers instead of tailoring their systems to operate on thousands of different implementations of ad players, only need to run through the Scout, which in turn provides the advertiser and/or third-party service provider with consistent tracking and measurement information.

Referring again to FIG. 2, any one of the client device 202, the RTB engine 211 and the third-party services 210 can be communicatively connected to one or more cloud services 214. Such cloud services 214 can, for example, enable storage and retrieval of data, execution of applications, authentication and other functionalities.

In the context of third-party services, after it is known which advertisement is going to play, the third-party tracking and measurements services are initialized. These third-party measurement tools and services are extendable; that is, new services and tools can be added or existing services can be removed. For example, a new Scout code, or a new configuration file associated with the Scout, can be provided to the client device to implement such changes to third-party services. Third-party tracking services may include their own libraries (e.g. JavaScript based libraries, SWFs, etc.) that can be loaded onto the Scout on the client-side to track the needed information. For instance, the Scout can embed or execute the third-party JavaScript. Once executed, the third-party library performs the prescribed actions for collecting information that is needed by the third-party service.

Once the data is provided to the third-party service (e.g., after the JavaScript transmits cookie information to Nielsen), the third-party service may conduct additional operations to accumulate, process and analyze the received information in conjunction with external data, if necessary. For example, a third-party service may conduct inquiries to other databases, social networks, etc. to obtain complementary information needed for achieving a particular tracking and measurement objective. The processed third-party tracking and measurement results are then provided to the BRX system (e.g., based on a campaign ID and site information). In such third-party service applications, the Scout provides information (e.g., fires tags) that populates campaign and advertising information in a variety of different third-party services.

In interactions with most third-party measurement services, the message exchange can be asymmetric in the context that the information is provided to the third-party service at a higher granularity but the results of third-party measurements are often only available at a lower level of granularity. However, such cumulative information may not accurately reflect the information needed by for a particular application and may further include singularities, outliers, or additional unwanted information that must be removed.

For example, a typical third-party service provider (e.g., Neilson) campaign can be provided to the BRX system for a particular monitoring interval that requires a start date and an end date. At the end of the monitoring interval, the third-party monitoring service provides the cumulative information for that period. For example, a particular set of information (e.g., the demographic of users of a certain webpage or certain video content) is provided for a 100-day period as cumulative numbers. Further, the third-party tracking and measurement results can only be provided for a maximum number of days (e.g., 100 days), after which the results are automatically reset and starts over again. One problem with such cumulative reporting is that demographics associated with certain websites may rapidly change and, therefore, a 100-day or a 50-day cumulative data may not accurately represent the fast-changing users' demographics for advertisement placement in an RTB system.

In some exemplary embodiments, such shortcomings can be alleviated by specifying multiple requests for third-party services (e.g., one request on a daily basis). Using the tracking and measurement results corresponding to those requests, tracking and measurement results for an arbitrary time interval can be obtained. For instance, by subtracting the cumulative results for day n−1 from day n, non-cumulative data for a single day is obtained. In another example, subtracting the cumulative results for day n−14 from day n, non-cumulative data for a 14-day period ending with day n is obtained. The above described processing can be used to, for example, obtain the total number of views for a particular period.

In some embodiments, additional data processing is provided to account for the switch-over or re-setting of data at the end of a monitoring interval. As noted earlier, some third party services provide such cumulative data for a maximum number of days (e.g., 100 days), after which the accumulation of the data is reset. Therefore, subtracting the tracking and measurement numbers for day n−1 from day n may result in a negative number (which is not correct). In some embodiments, the processing of the tracking measurement results can be adjusted to account for such switch-over or reset periods.

In other exemplary embodiments, additional operations needed to obtain the information appropriate for the BRX system include determining the number of unique viewers. To this end, the total number of views is divided by a "frequency" parameter which is the average number of times that individual viewers have actually seen a particular ad. This information is sometimes referred to as "uniques."

Other data provided by the third-party services includes what is called the "Universe," which represents the overall information about particular demographic segments. For example, if the BRX system is interested in male viewers between the ages of 12 and 17 on a particular day, the universe could indicate that, on this particular day, there were 1 million male viewers between the ages of 12 to 17. Such information, when processed in conjunction with the uniques, allows other numbers and parameters to be obtained. For example, if there are 1 million males in the 12-17 year age group, 100 impressions (views) of a particular ad with a frequency of 4, on average, the reach of the ad within this age group is (100/4)/1,000,000 or 0.0025%.

Moreover, the results generated by the third-party services, although in cumulative format, do not always increase from one day to the next. For example, subtracting the numbers for day n−1 from numbers for day n may sometimes result in a negative number. This inconsistency can be partly due to various normalization procedures that are undertaken by the third-party services. For example, if any one impression becomes too high, certain normalization operations are conducted by some third party service providers, which can result in the next cumulative number to be less than the previous number. In some embodiments, when processing the third-party data, such anomalies due to normalization procedures are identified and corrected to provide consistent and accurate numbers.

The disclosed technologies can generate tracking and measurement numbers either on a daily basis or over other desired period of time, even though the third-party services only provide data on a cumulative basis, with switch over periods, and retroactive normalizations that can greatly reduce the utility and ease-of-use of such data. To this end, the cumulative measurement and tracking results obtained from the third-party services are processed at the BRX system to remove various inconsistencies and provide the processed tracking and measurement information with flexibility based on needs of the BRX system and its customers.

In some scenarios, the third-party services provide their data in the form of a file (e.g., comma separate values (CSV)) at an uncertain time during a particular time interval (e.g., a particular day). Typically, such files are pulled from the third-party services. In some embodiments, the third-party services interface is configured to place such data files at a location in the cloud. This way, the third-party data can be accessed by the RTB system at any time and at any location. To provide further context for this feature, it should be appreciated that, at any given time, the RTB system is processing a large volume of bids, e.g., millions of bids, for advertisements and the associated signaling. At the same time, user devices fire a large number of pixels, e.g., millions of pixels, at the third-party services or the BRX system, while the associated tracking and measurement results are provided by the third-party services for BRX system ingestion. Further, such user devices are located throughout disparate geographic locations (e.g., worldwide). By configuring the system to locate the measurement and tracking data in the cloud, the BRX system is capable of accessing such large volumes of data rapidly and efficiently from any place and at any time.

Figure 3:
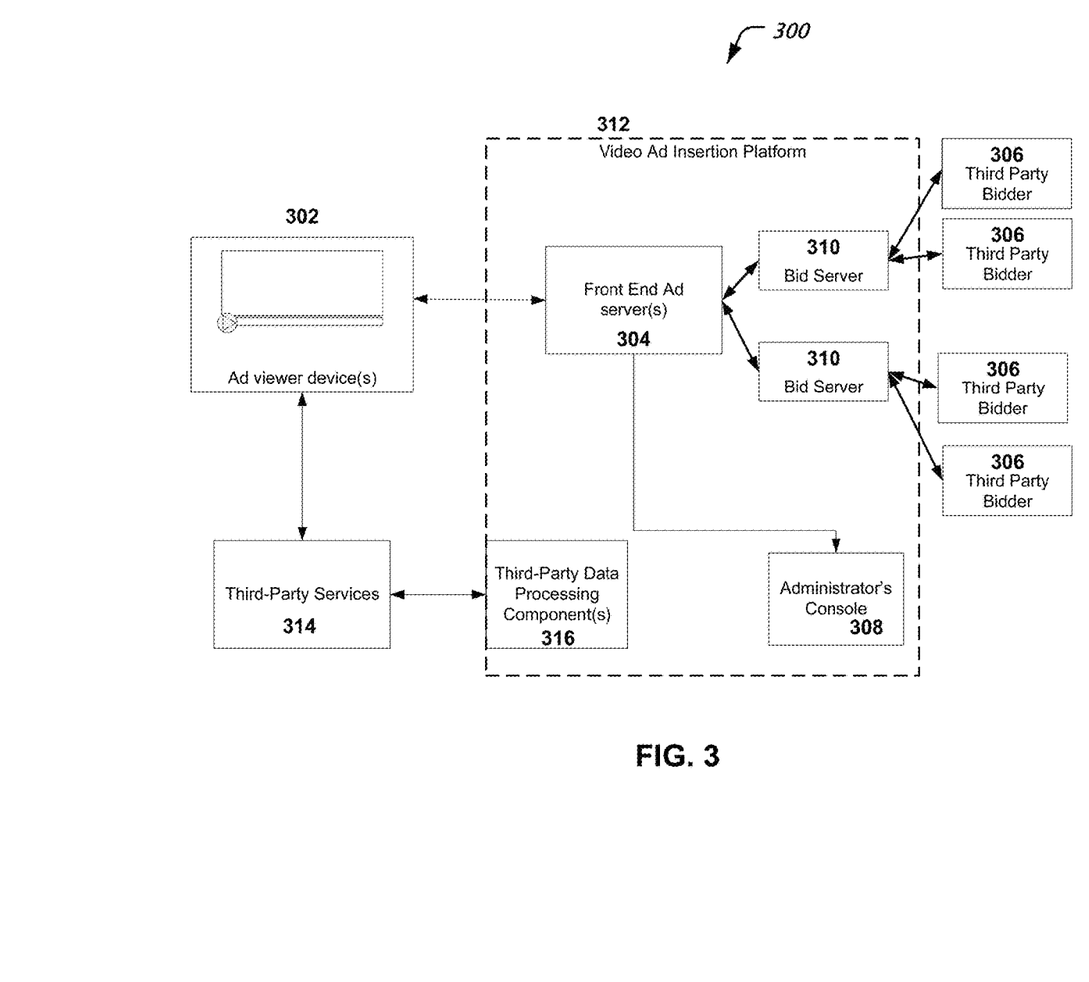
FIG. 3 illustrates an online video advertisement system that can be used to accommodate the disclosed embodiments.

FIG. 3 depicts a simplified view of an online video advertisement insertion architecture 300 that can accommodate the disclosed embodiments. An ad viewer's device 302 (e.g., a wireless or a mobile device, as discussed above) may be communicatively coupled (e.g., via the internet and a wired or wireless connection) with an ad server 304. The ad server 304 may communicate bids to show video ads to the device 302 to multiple bidders 306 via a plurality of bid server platforms 310. An operator or administrator console 308 may be provided to control the operation of the ad server 304 and bid servers 310. The ad server 304 may also be called front end ad server 304 in the sense that this ad server provides an entry into an online video advertisement system for an ad placement request from a viewer's device. The bid servers 310 provide a bidding interface between third party bidding servers and the online video advertisement service.

The ad server 304 may perform functions such as handling incoming ad requests from multiple ad viewer devices 302, and may respond with an ad or a "no ad" placement. The ad server 304 may operate on a time budget, e.g., 50 to 800 msec., within which it responds to an ad request. The ad server 304 may provide ad data to the viewer device 302 using VAST format. The decision about which advertisement to be sent may be based on various factors and real time data such as publisher placement, uniform resource locator (URL), a geographic location of the viewer device, time of day, demographic segment to which the viewer belongs, and so on.

When the ad server 304 receives a video placement request from the viewer's device 302, the ad server 304 may pass on the request to two or more bid servers 310. The request may include information about the viewer, the viewer's demographic profile and other rules associated with the ad placement opportunity that may influence the selection of a winning bid. In some embodiments, the front end ad servers 304, bid servers 310 and the administrator's console 308 may be part of a video ad insertion platform 312 offered by a single vendor, e.g., the BRX platform offered by Brightroll, Inc.

The bid servers 310 in turn request bids from multiple third party bidders 306. When bids are received from third party bidders 306, or at the end of a time period (e.g., 90 milliseconds), a decision is made about the winning bid. In some embodiments, the winning bid not only will have the highest dollar value but also should match the demographic profile of the viewer. For example, if the viewer is on the West coast, an advertisement for users on East coast may not be allowed to win bid even when the third party bidder bids the highest dollar value. The winning bidder is then notified for winning the bid. The winning bidder is provided with information to allow the winning bidder to transmit a video advertisement to the viewer.

As noted previously, the Scout (not shown in FIG. 3) resides at the ad viewer device(s) 302 and communicates with the Video Ad Insertion Platform 312, as well as third-party services 314. The third-party services 314 receive information from the client device 302 that is the information needed to conduct their respective services. Third-party tracking and measurement data is provided, directly or indirectly (e.g., through a cloud service), to the third-party processing component(s) 316 of the video ad insertion platform 312.

Figure 4:
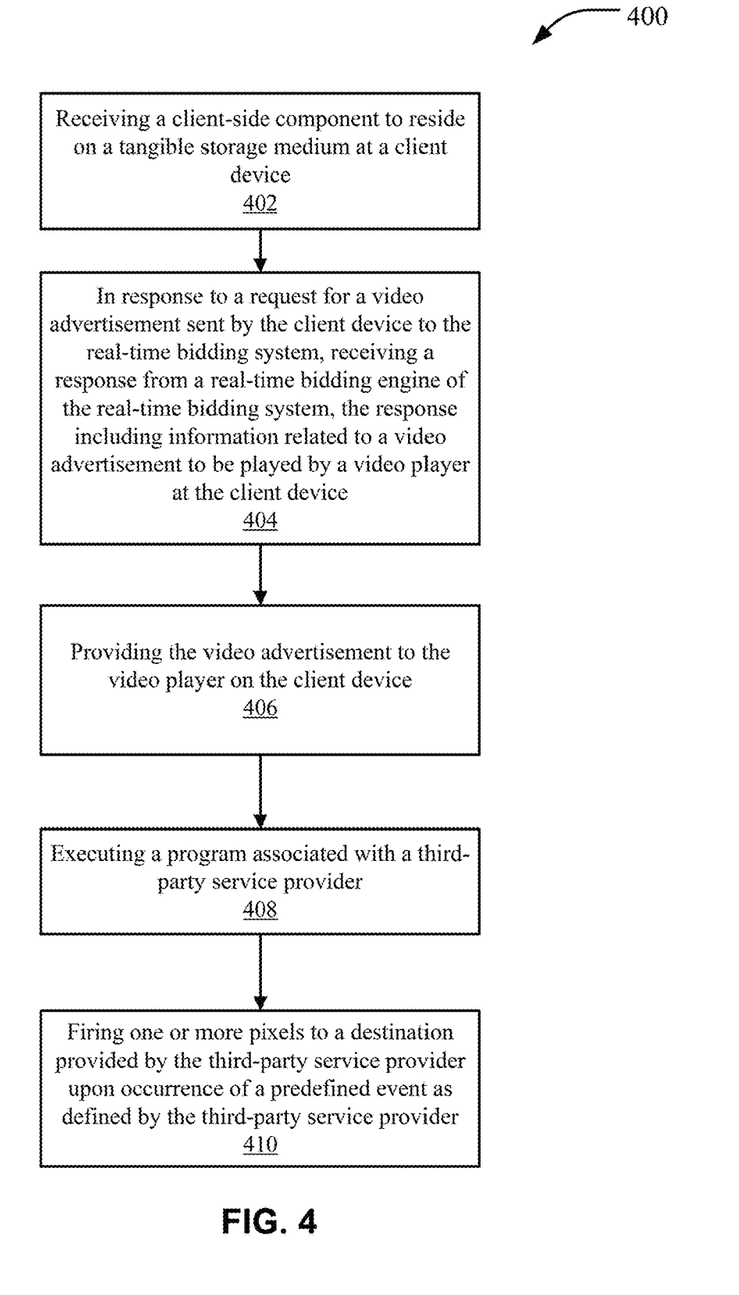
FIG. 4 illustrates a set of operations that can be carried out at a client device in a real-time bidding (RTB) system for video advertisements to facilitate communications with third-party service providers in accordance with an exemplary embodiment.

FIG. 4 illustrates a set of operations 400 that can be carried out at a client device in a real-time bidding (RTB) system for video advertisements to communicate with third-party service providers in accordance with an exemplary embodiment. At 402, a client-side component is received to reside on a tangible storage medium at a client device. At 404, in response to a request for a video advertisement sent by the client device to the real-time bidding system, a response from a real-time bidding engine of the real-time bidding system is received. The response includes information related to the video advertisement to be played by a video player at the client device. At 406, the video advertisement is provided to the video player on the client device. At 408, a program associated with a third-party service provider is executed. At 410, one or more pixels are fired to a destination provided by the third-party service provider upon occurrence of a predefined event as defined by the third-party service provider.

Figure 5:
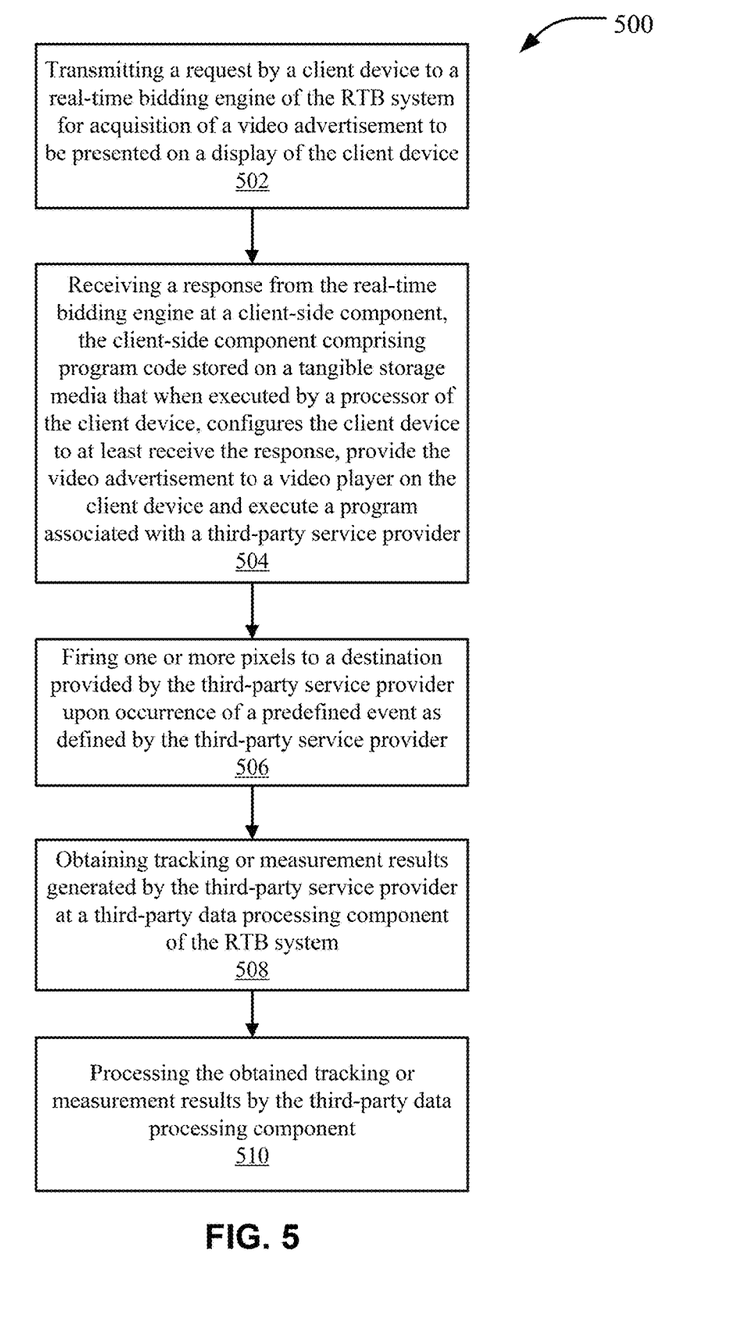
FIG. 5 illustrates a set of operations that can be carried out to facilitate tracking and measurement of video advertisements in a real-time bidding (RTB) system in accordance with an exemplary embodiment.

FIG. 5 illustrates a set of operations 500 that can be carried out to facilitate tracking and measurement of video advertisements in a real-time bidding (RTB) system in accordance with an exemplary embodiment. At 502, a request is transmitted by a client device to a real-time bidding engine of the RTB system for acquisition of a video advertisement to be presented on a display of the client device. At 504, a response is received from the real-time bidding engine at a client-side component. The client-side component includes program code stored on a tangible storage media that when executed by a processor of the client device, configures the client device to at least receive the response, provide the video advertisement to a video player on the client device and execute a program associated with a third-party service provider. At 506, one or more pixels are fired to a destination provided by the third-party service provider upon occurrence of a predefined event as defined by the third-party service provider. At 508, tracking or measurement results generated by the third-party service provider are obtained at a third-party data processing component of the RTB system. At 510, the obtained tracking or measurement results are processed by the third-party data processing component.

Figure 6:
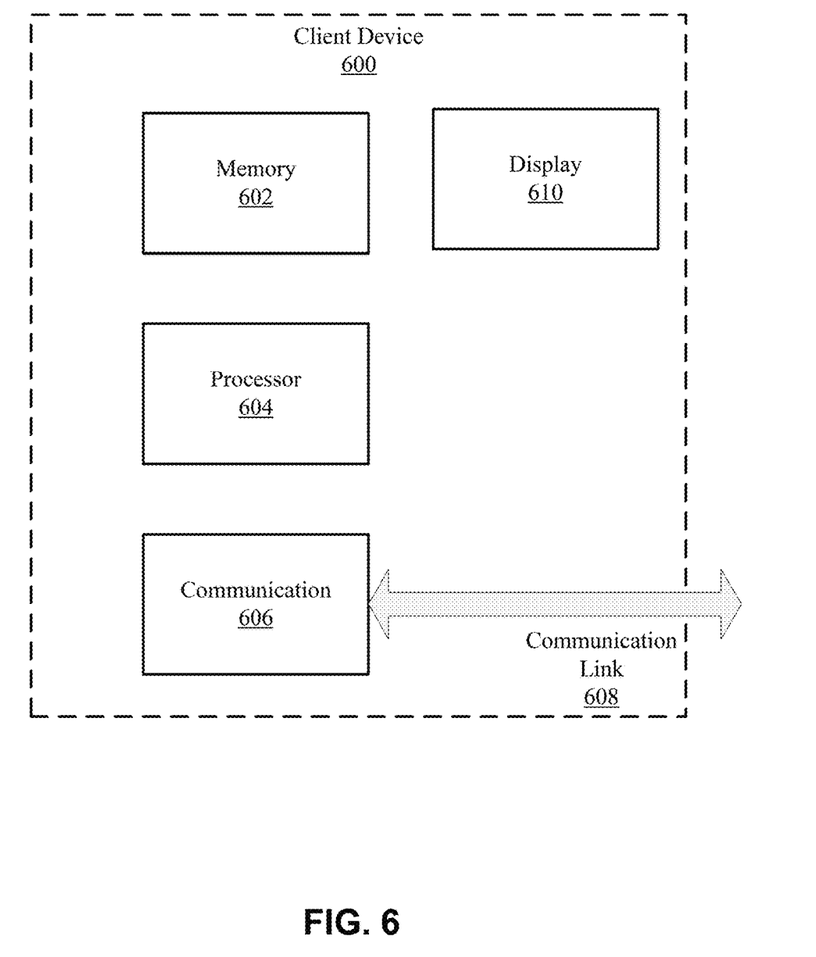
FIG. 6 illustrates a block diagram of a device within which various disclosed embodiments may be implemented.

Certain aspects of the disclosed technologies can be implemented as a device that includes a processor and a memory comprising processor executable code. The processor executable code, when executed by the processor, configures the device, including the components therein, to perform any one of and/or all operations that are described in the present application. For example, FIG. 6 illustrates a block diagram of a device 600 within which various disclosed embodiments may be implemented. The device 600 comprises at least one processor 606 (e.g., a microprocessor) and/or controller, at least one memory 602 unit that is in communication with the processor 606, and at least one communication unit 606 that enables the exchange of data and information, directly or indirectly, through the communication link 608 with other entities, devices, databases and networks. The communication unit 606 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The device 600 also includes a display 610 for displaying video advertisements and other visual content. The exemplary device 600 of FIG. 6 may, for example, be integrated as part of a client device that is shown in FIGS. 2 and 3.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A client-side component in a real-time bidding (RTB) system for video advertisements, the client-side component comprising program code stored on a non-transitory storage medium that when executed by a processor of a client device, configures the client device to:

receive a response from a real-time bidding engine of the RTB system, the response including information related to a video advertisement to be played by a video player at the client device;

receive the video advertisement and provide the video advertisement to the video player on the client device;

monitor interactions related to playback of the video advertisement via the video player to detect a predefined event regarding the playback of the video advertisement as defined by a third-party service provider;

determine whether the predefined event regarding the playback of the video advertisement is detected based on the monitoring the interactions related to playback of the video advertisement;

in response to detecting the predefined event, generate signaling indicating detection of the predefined event; and control execution of a program comprising a library that configures the client device to control transmission of the signaling by firing one or more pixels, wherein the program is associated with the third-party service provider or a second third-party service provider.

2. The client-side component of claim 1, wherein the predefined event comprises at least one of playing the video advertisement in full screen, muting the video advertisement, or unmuting the video advertisement.

3. The client-side component of claim 1, wherein the library is in Java Script.

4. The client-side component of claim 1, wherein the program code when executed by the processor configures the client side component to operate as an interface between the video player on the client device and the second third-party service provider.

5. The client-side component of claim 1, wherein the client-side component is reconfigurable so that one or more additional third-party service providers can be added or removed from the client-side component in each new version of the client-side component or each new version of an associated configuration file.

6. A method for facilitating tracking and measurement of video advertisements in a real-time bidding (RTB) system, the method comprising:

providing a client-side component to reside on a tangible storage medium at a client device;

receiving a request for a video advertisement from the client device;

in response to receiving the request for the video advertisement, controlling transmission of a response to the client device, the response including information related to the video advertisement to be played by a video player at the client device;

providing the video advertisement to the video player on the client device;

controlling reception, from the client device, of a signaling at a destination provided by a third-party service provider, wherein the signaling is generated by the client-side component to indicate a detection of a predefined event regarding playback of the video advertisement via the video player as defined by the third-party service provider, where the detection is based on monitoring of interactions related to the playback of the video advertisement by the client-side component on the client device;

sending, via a network connection, a request for complementary information, associated with the signaling, to a social network;

receiving, via the network connection, the complementary information from the social network;

generating tracking or measurement results by analyzing the signaling using the complementary information; and controlling execution of a program comprising a library that configures the client device to control transmission of the signaling by firing one or more pixels, wherein the program is associated with the third-party service provider or a second third-party service provider.

7. The method of claim 6, wherein the predefined event comprises at least one of playing the video advertisement in full screen, muting the video advertisement, or unmuting the video advertisement.

8. The method of claim 6, wherein the library is in JavaScript.

9. The method of claim 6, wherein the client side component operates as an interface between the video player on the client device and the second third-party service provider.

10. The method of claim 6, further comprising reconfiguring the client-side component to add one or more third-party service providers or to remove one or more third-party service providers functionalities from the client-side component, the reconfiguring comprising receiving a new version of the client-side component or a new version of an associated configuration file to replace an existing version of the client-side component or an existing configuration file.

11. A computer program product for facilitating tracking and measurement of a video advertisement in a real-time bidding (RTB) system, the computer program product embodied on a non-transitory storage medium at at least one client device of the RTB system, the computer program product comprising:

program code for receiving a client-side component to reside on a tangible storage medium at a client device;

program code for, in response to a request for a video advertisement sent by the client device to the real-time bidding system, receiving a response from a real-time bidding engine of the RTB system, the response including information related to the video advertisement to be played by a video player at the client device;

program code for receiving the video advertisement to the video player on the client device;

program code for monitoring interactions related to playback of the video advertisement to detect a predefined event regarding the playback of the video advertisement via the video player as defined by a third-party service provider;

program code for determining whether the predefined event regarding the playback of the video advertisement is detected based on the monitoring the interactions related to playback of the video advertisement;

program code for, in response to detecting the predefined event, generating signaling indicating detection of the predefined event; and program code associated with a second third-party service provider for controlling execution of a program comprising a library that configures the client device to control transmission of the signaling by firing one or more pixels, wherein the program is associated with the third-party service provider or the second third-party service provider.

12. A real-time bidding (RTB) system, comprising:

a real-time bidding engine configured to:
receive a request for a video advertisement from at least one client device,
receive a plurality of bids for video advertisement placement from a plurality of video advertisement suppliers or third-party bidders, and
transmit a response regarding bid results to the at least one client device; and a client device including a video player and a client-side component, the client device configured to transmit the request for the video advertisement to the real-time bidding engine, and wherein the client-side component is configured to control the client device to:
process the response received from the real-time bidding engine, the response including information related to the video advertisement to be played by the video player at the client device,
receive the video advertisement and provide the video advertisement to the video player on the client device,
monitor interactions related to playback of the video advertisement via the video player to detect a predefined event regarding the playback of the video advertisement as defined by a third-party service provider;
determine whether the predefined event in the playback of the video advertisement is detected based on the monitoring the interactions related to playback of the video advertisement,
in response to detecting the predefined event, generate signaling indicating detection of the predefined event, the signaling indicating the predefined event regarding the playback of the video advertisement, and
control execution of a program comprising a library that configures the client device to control transmission of the signaling by firing one or more pixels, wherein the program is associated with the third-party service provider or a second third-party service provider.

13. The real-time bidding (RTB) system of claim 12, further comprising:

a third-party data processing component configured to obtain tracking or measurement results generated by the third-party service provider based on the signaling, and to process the obtained tracking or measurement results, wherein:

the tracking or measurement results include reports, each report including measurement or tracking results for a particular fixed time interval; and the third-party data processing component is configured to process a plurality of the reports to produce measurement or tracking data for a time interval of any arbitrary duration smaller than the particular fixed time interval.

14. The real-time bidding system (RTB) of claim 13, wherein a first report provides cumulative measurement or tracking results for n−1 days, and a second report provides cumulative measurement or tracking results for n days, and a single-day measurement or tracking data is obtained by subtracting the cumulative measurement or tracking results of the first report from the cumulative measurement or tracking results of the second report.

15. The real-time bidding (RTB) system of claim 12, further comprising:
a third-party data processing component configured to obtain tracking or measurement results generated by the third-party service provider based on the signaling, and to process the obtained tracking or measurement results, wherein the third-party data processing component is configured to process the obtained tracking or measurement results to remove inconsistencies due to switch-over periods associated with the third-party measurement or tracking results.

16. The real-time bidding (RTB) system of claim 12, further comprising:
a third-party data processing component configured to obtain tracking or measurement results generated by the third-party service provider based on the signaling, and to process the obtained tracking or measurement results, wherein the third-party data processing component is configured to process the obtained tracking or measurement results to remove inconsistencies due to normalization procedures that are undertaken by the third-party service provider.

17. The real-time bidding (RTB) system of claim 12, further comprising:
a third-party data processing component configured to obtain tracking or measurement results generated by the third-party service provider based on the signaling, and to process the obtained tracking or measurement results; and
one or more cloud services that are configured to store one or both of: the tracking or measurement results generated by the third party service provider, or the processed tracking or measurement results.

18. A method for facilitating tracking and measurement of video advertisements in a real-time bidding (RTB) system, the method comprising:
transmitting a request by a client device to a real-time bidding engine of the RTB system for acquisition of a video advertisement to be presented on a display of the client device;
receiving a response from the real-time bidding engine at a client-side component, the client-side component comprising program code stored on a non-transitory storage medium;
receiving the response and the video advertisement;
providing the video advertisement to a video player on the client device;
monitoring interactions related to playback of the video advertisement via the video player to detect a predefined event regarding the playback of the video advertisement as defined by a third-party service provider;
determining whether the predefined event in the playback of the video advertisement is detected based on the monitoring the interactions related to playback of the video advertisement;
in response to detecting the predefined event, generating signaling indicating detection of the predefined event, the signaling indicating the predefined event regarding the playback of the video advertisement;
controlling execution of a program comprising a library that configures the client device to control transmission of the signaling by firing one or more pixels, wherein the program is associated with the third-party service provider or a second third-party service provider;
obtaining, at a third-party data processing component of the RTB system, tracking or measurement results generated by the third-party service provider based on the signaling; and
processing the obtained tracking or measurement results by the third-party data processing component.

19. The method of claim 18, wherein:
the tracking or measurement results from the third-party service provider include reports, each report including measurement or tracking results for a particular fixed time interval; and
the processing by the third-party data processing component comprises processing a plurality of the reports to produce measurement or tracking data for a time interval of any arbitrary duration smaller than the particular fixed time interval.

20. The method of claim 18, wherein the third-party data processing component is configured to process the obtained tracking or measurement results to remove inconsistencies due to one or both of: switch-over periods associated with the third-party measurement or tracking results, or normalization procedures that are undertaken by the third-party service provider.

21. The method of claim 18, further comprising: storing one or both of the tracking or measurement results generated by the third party service provider, or the processed tracking or measurement results in a cloud.

22. A computer program product for facilitating tracking and measurement of video advertisements in a real-time bidding (RTB) system, the computer program product embodied on one or more non-transitory storage media, the computer program product comprising:
program code for transmitting a request by a client device to a real-time bidding engine of the RTB system for acquisition of a video advertisement to be presented on a display of the client device;
program code for a client-side component for:
receiving a response from the real-time bidding engine, receiving the video advertisement,
providing the video advertisement to a video player on the client device,
monitoring interactions related to playback of the video advertisement via the video player to detect a predefined event regarding the playback of the video advertisement as defined by a third-party service provider;
determining whether the predefined event in the playback of the video advertisement is detected based on the monitoring the interactions related to playback of the video advertisement, and
in response to detecting the predefined event, generating signaling indicating detection of the predefined event, the signaling indicating the predefined event regarding the playback of the video advertisement,
program code for controlling execution of a program comprising a library that configures the client device to control transmission of the signaling by firing one or more pixels, wherein the program is associated with the third-party service provider or a second third-party service provider;
program code at a third-party data processing component of the RTB system for obtaining tracking or measurement results generated by the third-party service provider based on the signaling; and program code for processing the obtained tracking or measurement results.

* * * * *